# United States Patent
Schleicher et al.

(10) Patent No.: US 9,150,199 B2
(45) Date of Patent: Oct. 6, 2015

(54) SAFETY DEVICE FOR MOTOR VEHICLES

(71) Applicants: Roman Schleicher, Ludwigsburg (DE); Enrico Rath, Stuttgart (DE)

(72) Inventors: Roman Schleicher, Ludwigsburg (DE); Enrico Rath, Stuttgart (DE)

(73) Assignee: ROBERT BOSCH GMBH, Stuttgart (DE)

( * ) Notice: Subject to any disclaimer, the term of this patent is extended or adjusted under 35 U.S.C. 154(b) by 41 days.

(21) Appl. No.: 13/955,169

(22) Filed: Jul. 31, 2013

(65) Prior Publication Data

US 2014/0039786 A1 Feb. 6, 2014

(30) Foreign Application Priority Data

Aug. 1, 2012 (DE) .......................... 10 2012 213 568

(51) Int. Cl.
| | |
|---|---|
| *B60R 21/013* | (2006.01) |
| *B60W 30/08* | (2012.01) |
| *B60W 40/04* | (2006.01) |
| *B60T 7/12* | (2006.01) |
| *B60W 30/09* | (2012.01) |
| *B60W 10/04* | (2006.01) |
| *B60W 10/184* | (2012.01) |
| *B60R 21/01* | (2006.01) |
| *B60R 21/0132* | (2006.01) |
| *B60W 30/095* | (2012.01) |

(52) U.S. Cl.
CPC *B60T 7/12* (2013.01); *B60W 10/04* (2013.01); *B60W 10/184* (2013.01); *B60W 30/09* (2013.01); *B60R 21/01* (2013.01); *B60R 21/0132* (2013.01); *B60W 30/095* (2013.01); *B60W 30/0956* (2013.01); *B60W 2720/106* (2013.01); *B60Y 2300/18158* (2013.01)

(58) Field of Classification Search
CPC ...... G08G 9/02; G08G 3/02; G01S 2013/935; G01S 2013/9364; G01S 2013/9367; G01S 13/66; G01S 13/862; G01S 13/865; G01S 13/93; B60W 30/09; B60W 30/08; B60W 2550/306; B60W 2550/308; B60W 50/0097; B60T 2201/022
See application file for complete search history.

(56) References Cited

U.S. PATENT DOCUMENTS

| 8,736,483 B2* | 5/2014 | Takeuchi ........................ 342/71 |
| 8,751,142 B2* | 6/2014 | Kim ............................ 701/301 |
| 2013/0226432 A1* | 8/2013 | Tsuruta et al. .................. 701/96 |

FOREIGN PATENT DOCUMENTS

DE 102007024391 A1 11/2008

* cited by examiner

*Primary Examiner* — James Trammell
*Assistant Examiner* — Demetra Smith-Stewart
(74) *Attorney, Agent, or Firm* — Kenyon & Kenyon LLP

(57) ABSTRACT

A safety device for motor vehicles is provided having a sensor system for locating objects in the area in front of the vehicle and at least in the lateral surroundings of the vehicle, a prediction unit for detecting a risk of collision with an object coming from the side, a detection unit for detecting an area in front of the vehicle which is clear of potential collision objects, and a control unit which is configured to suppress braking of the host vehicle when a risk of collision with an object coming from the side is detected and when the area in front of the vehicle is recognized as being clear if this would presumably make a collision with the object coming from the side avoidable. A method for intervening in the longitudinal guidance of a motor vehicle is also provided.

11 Claims, 3 Drawing Sheets

SAFETY DEVICE FOR MOTOR VEHICLES

CROSS REFERENCE

The present application claims the benefit under 35 U.S.C. §119 of German Patent Application NO. DE 102012213568.5 filed on Aug. 1, 2012, which is expressly incorporated herein by reference in its entirety.

FIELD

The present invention relates to a safety device for motor vehicles, having a sensor system for locating objects at least in front of the vehicle.

BACKGROUND INFORMATION

There are conventional collision warning devices, which assist the driver in driving the motor vehicle to contribute toward reducing the risk of accidents. Such collision warning devices are part of a driver assistance system, for example, including a positioning system in the form of an angle-resolving radar sensor, for example, with which distances, relative velocities and azimuths of objects located in front of the vehicle may be measured. On the basis of these data and the dynamic data of the vehicle, the collision warning device then detects that a collision is imminent, for example, and may calculate in particular a time after which the collision would occur if the dynamic status of the vehicle were not altered. If this time is below a certain threshold value, a warning signal is output and then converted to an acoustic warning signal for the driver, for example, or an autonomous emergency braking is triggered to prevent the collision or at least reduce the consequences of same.

German Patent Application No. DE 10 2007 024 391 A1 describes one such collision warning device, which also includes a warning function for an imminent collision with a guide rail at the edge of the lane.

SUMMARY

An object of the present invention is to provide a safety device for motor vehicles with which the risk of an accident may be further reduced.

In accordance with the present invention an example safety device for motor vehicles includes:
a sensor system for locating objects in front of the vehicle and at least in the lateral surroundings of the vehicle,
a prediction unit for detecting the risk of collision with an object coming from the side,
a detection unit for detecting an area clear of potential collision objects in front of the vehicle, and
a control unit which is configured to suppress braking of the host vehicle when the risk of collision with an object coming from the side is detected and when the area in front of the vehicle is recognized as being clear if this would presumably make it possible to avoid a collision with the object coming from the side.

When a driver of a vehicle notices a risk of collision with a vehicle coming from a side at an intersection too late, a situation may occur in which the vehicles would pass by one another without a collision if the host vehicle were to continue at a constant velocity or with a positive acceleration, whereas braking or stopping the host vehicle would result in a collision. In such a case, the driver may respond incorrectly by braking to a standstill instead of continuing to drive or accelerating to prevent the collision. The safety device according to the present invention may avert a collision in a few such situations by suppressing a braking action by the driver and optionally even accelerating the host vehicle autonomously.

The example safety device according to the present invention thus makes it possible, in certain traffic situations in which a driver brakes at an intersection because he has detected a risk of collision with a vehicle coming from the side, that the safety device overrides a braking action by the driver if the collision may be avoided only in that way.

Unlike traditional collision warning devices, this safety device thus does not support the deceleration of the host vehicle in certain traffic situations but instead suppresses active braking. The possible responses of a driver assistance system which includes this safety device are thus substantially expanded when there is an imminent risk of collision with a vehicle coming from the side.

The area in front of the vehicle is understood here to be the area in front of the host vehicle, which may be limited by a range of the sensor system which depends on the azimuth, for example. The lateral vehicle surroundings are understood here to refer to an area at the side of and next to the host vehicle, which may be limited by the range of the sensor system, which depends on the azimuth.

The area in front of the vehicle and the vehicle surroundings may each be a subsection of a detection range of the sensor system, which is limited with respect to the azimuth and/or the distance. Different sensors of the sensor systems whose detection ranges may overlap may be assigned to the area in front of the vehicle and the lateral vehicle surroundings.

The area in front of the vehicle includes in particular a road section directly in front of the vehicle through which the host vehicle may potentially drive. The lateral vehicle surroundings preferably include a lateral area in front of the vehicle, so that objects obliquely in front of the host vehicle may be located.

The control unit is preferably configured to suppress braking of the host vehicle and/or to induce an acceleration of the host vehicle on detection of a risk of collision with an object coming from the side and if the area in front of the vehicle is recognized as clear, if a collision with an object coming from the side is presumably avoidable. This further expands the possible responses to prevent a collision.

BRIEF DESCRIPTION OF THE DRAWINGS

Exemplary embodiments of the present invention are shown in the figures and explained in greater detail below.

DETAILED DESCRIPTION OF EXAMPLE EMBODIMENTS

Figure 1:
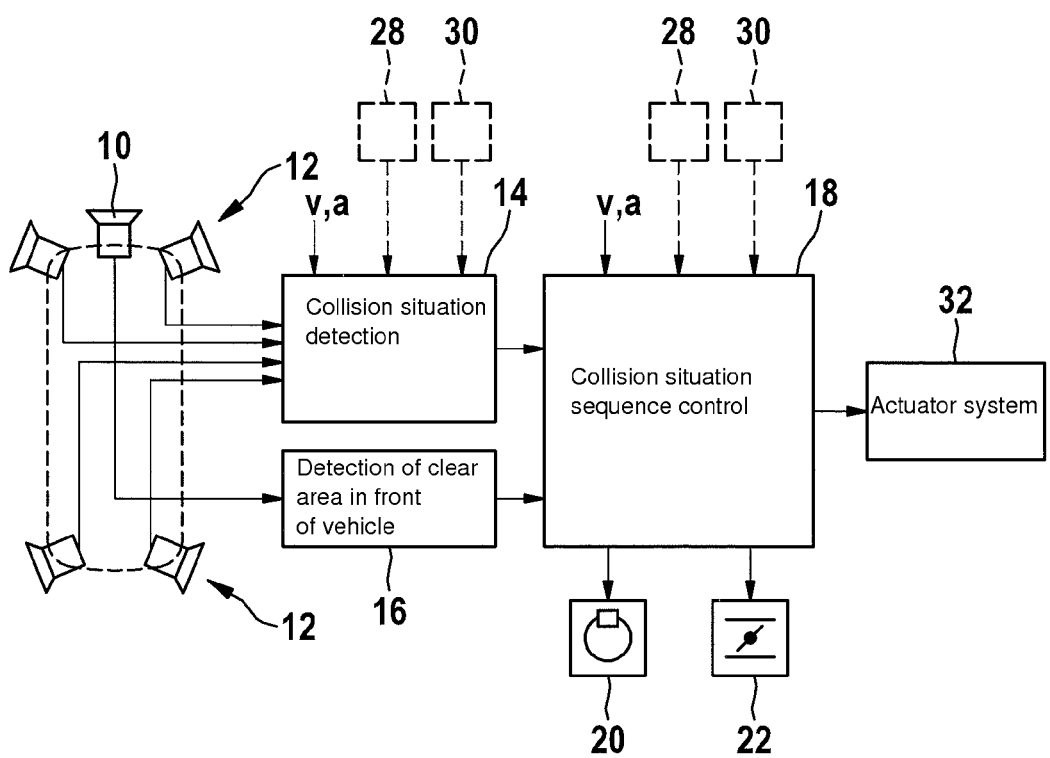
FIG. 1 shows a block diagram of an example safety device for a motor vehicle.

The safety device shown in FIG. 1 includes a sensor system having a front area sensor system 10 for locating objects in front of the host vehicle and a surroundings sensor system 12 for locating vehicles in the lateral surroundings of the vehicle.

Sensor systems 10, 12 may include, for example, radar sensors, video-based sensors, ultrasonic sensors, laser-based sensors and/or a communication device for exchanging or receiving information about other vehicles or objects located in the surroundings of the host vehicle. Such communication systems are referred to as car-to-car systems or car-to-X systems, for example. They may transmit information about the position of vehicles in the surroundings of the host vehicle, for example.

Front area sensor 10 may in particular be a long-range radar (LRR) sensor, which is connected to a driver assistance system, for example, including an adaptive cruise control (ACC) which is configured to regulate the driving velocity and the distance from a preceding vehicle.

Surroundings sensor system 12 may include midrange radar (MRR) sensors, for example. Surroundings sensor system 12 preferably includes sensors on the right and left sides of the vehicle. Surroundings sensor system 12 preferably includes front area sensors and rear area sensors. The sensors of surroundings sensor system 12 may be, for example, sensors used for other driver assistance functions of a driver assistance system such as a lane change assistant, for example.

The safety device shown in FIG. 1 also includes a prediction unit 14 for detecting a risk of collision with an object coming from the side, in particular for detecting a risk of collision with a vehicle coming from the side, based on position data of surroundings sensor system 12.

In addition, the safety device includes a detection unit 16 for detecting an area clear of potential collision objects in front of the vehicle based on position data from front area sensor system 10. Detection unit 16 may be part of an evaluation unit for signals received from front area sensor system 10, for example.

Prediction unit 14 and detection unit 16 are connected to a control unit 18 which is configured to control a braking system 20 and a drive system 22 of the vehicle for intervening in the longitudinal guidance of the vehicle.

Figure 2:
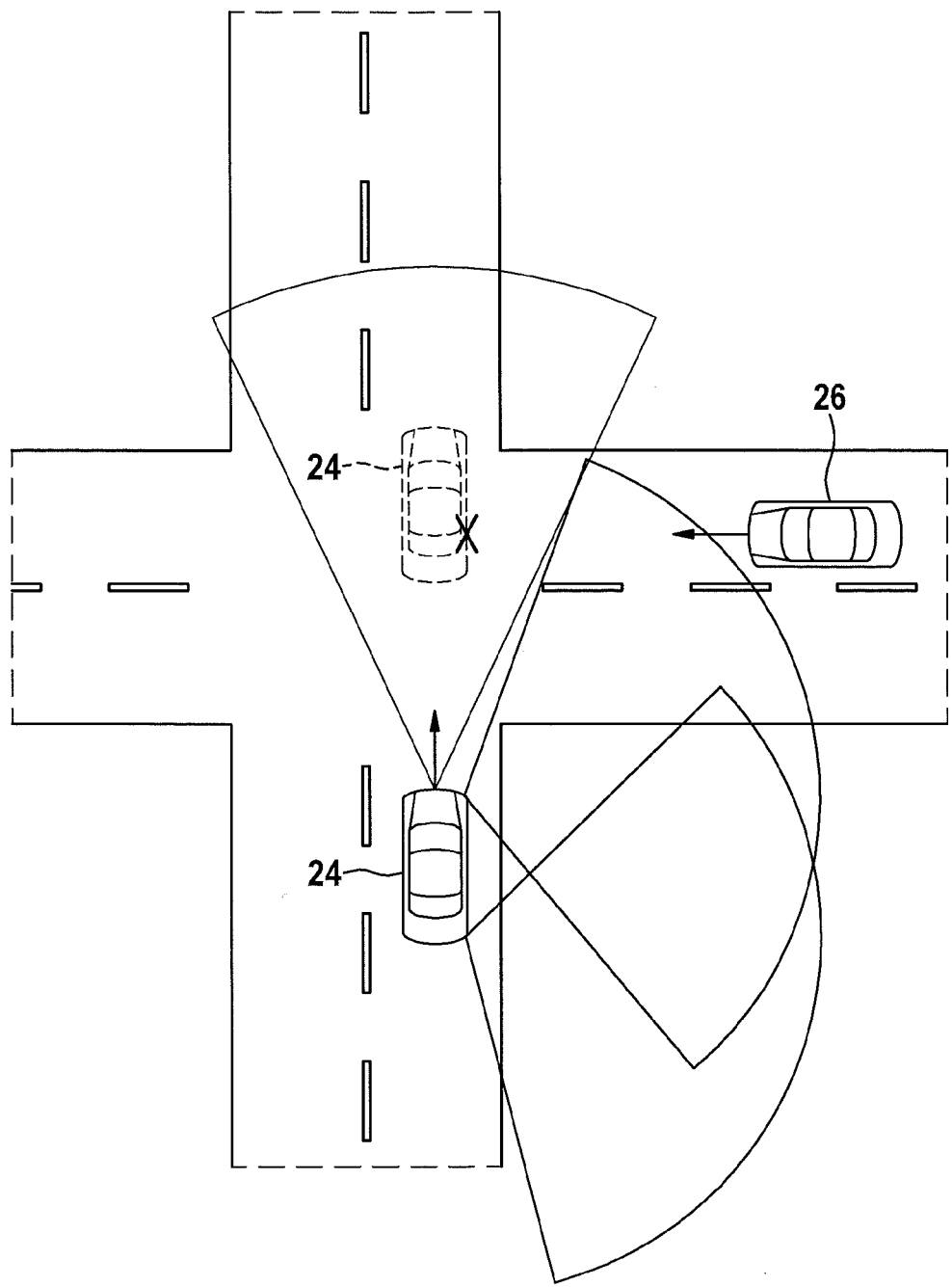
FIG. 2 shows a layout to illustrate the operation of the example safety device in a traffic situation.

FIG. 2 shows an example of a traffic situation involving host vehicle 24 and a vehicle 26 coming from the side. Both vehicles approach an intersection from different directions. The routes to be expected of vehicles 24, 26 intersect locally. Vehicle 26 coming from the side is within the detection range of surroundings sensor system 12. Detection angle ranges of approximately 120° each of a front area sensor and a rear area sensor on the side of host vehicle 24 facing approaching vehicle 26 are shown as an example. In addition, a detection angle range of front area sensor system 10 is also shown schematically.

Prediction unit 14 is configured to detect a risk of collision with a vehicle 26 coming from the side based on position data from surroundings sensor system 12 and based on information about velocity v and acceleration a of host vehicle 24. Prediction unit 14 in particular is configured to estimate, based on the position data and the aforementioned data about host vehicle 24 for at least one assumed route of host vehicle 24, whether, at a point in time in the corresponding route of host vehicle 24, it is to be expected that the distance from approaching vehicle 26 will drop below a threshold value, so that a collision will presumably occur. The position data of surroundings sensor system 12 includes, for example, information about the location, the direction, the velocity, the route and/or the acceleration of vehicle 26, the position data being determinable in relation to host vehicle 24 or absolutely, i.e., with respect to fixed position coordinates. The estimate is based on an assumed route of, for example, vehicle 26 coming from the side, which is in turn determined based on the position data of surroundings sensor system 12.

A particular route of host vehicle 24 to be expected may be calculated more accurately, for example, by taking into account an uphill grade in the road when control unit 18 has access to uphill grade data from a grade sensor 28 and/or from information about the course of the road and the position of the vehicle, for example, via a GPS and navigation device 30.

The routes to be expected may also be calculated, taking into account a safety margin for the expected location, the velocity and/or acceleration and evaluated with respect to a risk of collision.

Unless otherwise indicated, the term "route" used below is understood to refer to the route of the host vehicle.

The route of host vehicle 24 includes, for example, information about the velocity and/or acceleration of host vehicle 24 over time and/or the location of host vehicle 24 over time and/or the distance of host vehicle 24 from vehicle 26 coming from the side. The route may be determined, for example, based on an extrapolation of the instantaneous values of relative velocity and distance between vehicles 24, 26, for example, assuming a route with a constant value of an instantaneous acceleration a of host vehicle 24 in the case of a negative acceleration a to a standstill of host vehicle 24 and assuming a corresponding route of vehicle 26 coming from the side.

The prediction result of prediction unit 14 is transmitted to control unit 18. It includes in particular an estimate of the risk of collision with vehicle 26 coming from the side for the at least one assumed route of host vehicle 24.

In the example in FIG. 2, prediction unit 14 detects a risk of collision with vehicle 26 by chronological extrapolation of the instantaneous values of the relative velocity and the distance between vehicles 24, 26. If the instantaneous braking deceleration is retained, i.e., negative acceleration a, then the host vehicle will come to a standstill in the intersection, and a collision will occur at the side of the host vehicle marked with an X when approaching vehicle 26 encounters host vehicle 24.

Detection unit 16 transmits its detected findings to control unit 18. The detected findings include information about whether the area in front of the vehicle in the detection range of front area sensor system 10 is recognized as being clear of potential collision objects. Detection unit 16 may be configured to detect both moving objects and stationary objects.

In the example described here, it is assumed that detection unit 16 detects the area in front of the vehicle as being clear.

The prediction result of prediction unit 14 additionally includes an assessment of the risk of collision for a route without further acceleration and with the instantaneous value of driving velocity v of host vehicle 24. The prediction result additionally includes an assessment of the risk of collision for a route according to a positive acceleration a of host vehicle 24.

Control unit 18 is configured to intervene in the longitudinal guidance of the host vehicle based on the predicted findings of prediction unit 14 and based on the detected findings of detection unit 16 to avoid a collision if at all possible.

Control unit 18 is in particular configured to select, on the basis of the evaluation of the risk of collision for the different assumed routes, a route of host vehicle 24 in which there will presumably not be a collision with vehicle 26 coming from the side provided that the area in front of the vehicle is recognized as being clear of other potential collision objects and such a route has been found.

Figure 3:
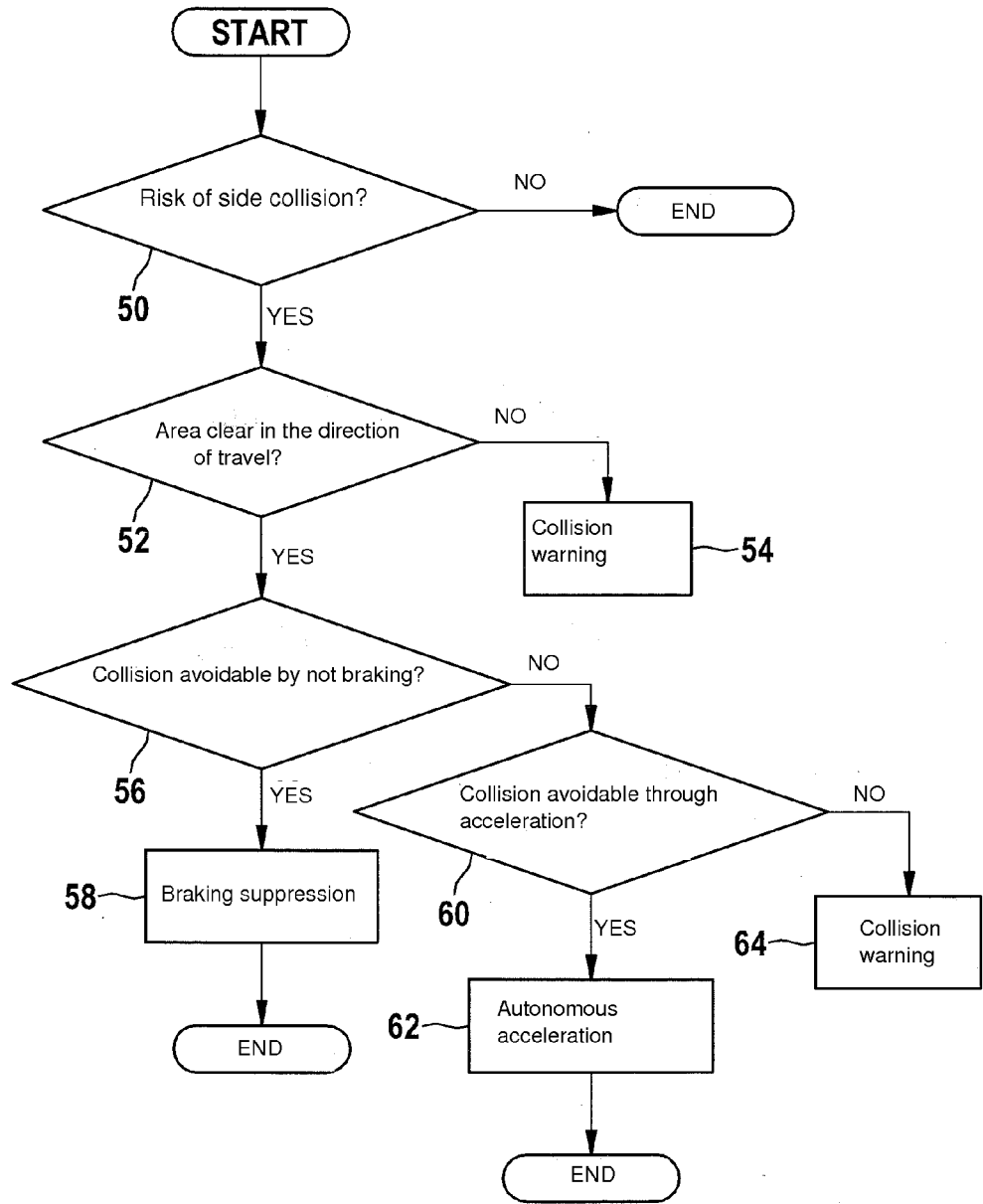
FIG. 3 shows a flow chart to illustrate the operation of the example safety device.

The operation of the safety unit and of control unit 18 in particular is described in greater detail below with reference to FIG. 3.

If prediction unit 14 has detected a risk of collision with vehicle 26 coming from the side for an assumed route based on the instantaneous values of velocity v and acceleration a (step 50), then control unit 18 checks on whether the conditions defined below are met at the same time. However, if there is no risk of a collision with a vehicle coming from the side, then the vehicle longitudinal guidance takes place according to control by the driver or optionally by an adaptive cruise control in a manner known per se.

When a risk of collision is detected, control unit 18 checks (step 52) on whether detection unit 16 has detected an area in front of the vehicle which is clear of potential collision objects. Detection by detection unit 16 includes, for example, the area in front of the vehicle in the periphery of the azimuth detection range and the distance detection range of front area sensor system 10.

If the area in front of the vehicle is detected as not being clear, for example, because at least one potential collision object is detected in the area in front of the vehicle, control unit 18 does not intervene in the longitudinal guidance of the vehicle but instead merely outputs a collision warning signal (step 54). For example, the collision warning signal triggers an actuator system 32 for triggering a response, as a function of the risk of collision. Such an actuator system is known per se for collision warning devices and includes, for example, a warning signal generator to warn the driver about an imminent risk of collision. However, the actuator system may also be designed in such a way that it actively intervenes in the vehicle control, for example, into braking system 20, to prevent the collision if possible, or if this is no longer possible, to at least attenuate the consequences of the collision. For example, actuator system 32 may be configured to carry out emergency braking as a function of the risk of collision. Emergency braking may be triggered, for example, when a threshold value of a braking deceleration, which is necessary for stopping in time, is exceeded based on instantaneous velocity v and an expected time to collision.

In addition to the collision warning signal described here, control unit 18 may also output to actuator system 32 a calculated time to collision. This may be used, for example, for a precrash system for attenuating the consequences of the collision.

If a risk of collision with a vehicle 26 coming from the side has been detected and if the area in front of the vehicle has also been recognized as clear, control unit 18 (step 56) checks on whether a collision with vehicle 26 is presumably avoidable by suppressing braking, i.e., by a route having essentially the instantaneous velocity v of the host vehicle. By intervening in the longitudinal guidance of the vehicle, control unit 18 suppresses braking of host vehicle 24 (step 58) if a collision with vehicle 26 coming from the side is thereby avoidable.

In this example, host vehicle 24 continues to move forward without drive and without braking due to the suppression of braking of the host vehicle, and it will presumably pass by the route of vehicle 26 without resulting in a collision. Vehicles 24, 26 drive past one another.

When control unit 18 comes to the conclusion that a collision with vehicle 26 is unavoidable even if braking is suppressed, control unit 18 will check (step 60) on whether the collision is presumably avoidable for a route including autonomous acceleration of host vehicle 24.

If this is the case, then (in step 62) an intervention takes place in the longitudinal guidance of the vehicle by suppressing the braking and inducing acceleration of the vehicle. Control unit 18 therefore intervenes in braking system 20 and drive system 22. This may be accomplished, for example, by stipulating the vehicle acceleration in accordance with the selected route to an adaptive cruise control of host vehicle 24, which then takes over regulation of the driving velocity to accelerate at the predefined acceleration. Vehicle 24 then passes by the path of vehicle 26 before vehicle 26 has reached the spot of a potential collision. Vehicles 24, 26 drive past one another.

If control unit 18 does not find that a collision is probably avoidable for any of the routes detected, then control unit 18 will not intervene in the longitudinal guidance of the vehicle. Instead, a collision warning will be output to actuator system 32, as described above (step 64).

What is claimed is:

1. A safety device for a motor vehicle, comprising
   a sensor system to locate objects in an area in front of the vehicle and at least in lateral surroundings of the vehicle;
   a prediction unit to detect a risk of collision with an object coming from a side of the vehicle;
   a detection unit to detect an area clear of potential collision objects in front of the vehicle; and
   a control unit configured to suppress braking of the vehicle when a risk of collision with an object coming from the side is detected, and when the area in front of the vehicle is recognized as being clear, if this would make a collision with the object coming from the side avoidable.

2. The safety device as recited in claim 1, wherein the control unit is configured to at least one of: i) suppress braking of the vehicle when the risk of collision with the object coming from the side is detected and when the area in front of the vehicle is recognized as being clear, and ii) induce acceleration of the vehicle if this would make it possible to avoid a collision with the object coming from the side.

3. The safety device as recited in claim 2, wherein the control unit is configured to induce acceleration of the vehicle when a collision with the object coming from the side is avoidable but the collision presumably is not avoidable only by suppressing braking of the vehicle.

4. The safety device as recited in claim 2, wherein the control unit is configured to suppress braking of the vehicle when the risk of collision with the object coming from the side is detected and when the area in front of the vehicle is recognized as being clear.

5. The safety device as recited in claim 2, wherein the control unit is configured to induce acceleration of the vehicle if this would make it possible to avoid a collision with the object coming from the side.

6. The safety device as recited in claim 1, wherein the prediction unit is configured to evaluate the risk of collision with an object coming from the side for at least two different assumed routes of the host vehicle.

7. The safety unit as recited in claim 6, wherein the assumed routes include at least one route in which a braking system of the vehicle decelerates the vehicle and at least one route in which there is no braking action by the braking system after an end of a present braking intervention.

8. The safety unit as recited in claim 6, wherein the assumed routes include at least one route in which a positive acceleration of the vehicle takes place by a drive system of the vehicle.

9. The safety device as recited in claim 1, wherein the prediction unit detects the risk of collision taking into account a distance and a velocity of the object coming from the side.

10. A motor vehicle, comprising:
    a safety device, including:
       a sensor system to locate objects in an area in front of the vehicle and at least in lateral surroundings of the vehicle;
       a prediction unit to detect a risk of collision with an object coming from a side of the vehicle;
       a detection unit to detect an area clear of potential collision objects in front of the vehicle; and a control unit configured to suppress braking of the vehicle when a risk of collision with an object coming from the side is detected, and when the area in front of the vehicle is recognized as being clear, if this would make a collision with the object coming from the side avoidable.

11. A method for intervening in a longitudinal guidance of a motor vehicle, comprising:

detecting whether there is a risk of collision with an object coming from a side of the vehicle;

detecting whether an area in front of the vehicle is clear of potential collision objects; and automatically suppressing braking of the vehicle, if a risk of collision with an object has been detected and the area in front of the vehicle has been recognized as being clear, if this would make it possible to prevent a collision with the object coming from the side.

* * * * *